(12) United States Patent  
Kawata et al.

(10) Patent No.: US 8,693,804 B2  
(45) Date of Patent: Apr. 8, 2014

(54) IMAGE PROCESSING APPARATUS AND METHOD

(75) Inventors: Satoshi Kawata, Yokohama (JP); Kenzo Isogawa, Tachikawa (JP); Nobuyuki Matsumoto, Inagi (JP); Toshimitsu Kaneko, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 6 days.

(21) Appl. No.: 13/548,709

(22) Filed: Jul. 13, 2012

(65) Prior Publication Data

US 2013/0011077 A1 Jan. 10, 2013

Related U.S. Application Data

(63) Continuation-in-part of application No. PCT/JP2010/000126, filed on Jan. 13, 2010.

(51) Int. Cl.
*G06K 9/64* (2006.01)

(52) U.S. Cl.
USPC ............................ 382/278; 382/174; 382/275

(58) Field of Classification Search
USPC ................ 382/275, 278, 103, 173, 284, 290; 370/342, 442; 345/147; 375/130, 148; 348/588
See application file for complete search history.

(56) References Cited

U.S. PATENT DOCUMENTS

| | | | |
|---|---|---|---|
| 7,110,435 B1 * | 9/2006 | Sorrells et al. | 375/147 |
| 7,171,048 B2 * | 1/2007 | Wenzel et al. | 382/209 |
| 7,327,887 B2 * | 2/2008 | Wenzel | 382/209 |
| 7,450,765 B2 * | 11/2008 | Wenzel | 382/209 |
| 2001/0021271 A1 | 9/2001 | Ishibashi | |
| 2002/0097906 A1 | 7/2002 | Ishiyama | |
| 2008/0075359 A1 | 3/2008 | Ishiyama | |
| 2008/0080763 A1 | 4/2008 | Ishiyama | |
| 2008/0094393 A1 | 4/2008 | Ishiyama | |

FOREIGN PATENT DOCUMENTS

| | | |
|---|---|---|
| JP | 2000-163569 | 6/2000 |
| JP | 2001-034756 | 2/2001 |
| JP | 2001-251645 | 9/2001 |

(Continued)

OTHER PUBLICATIONS

Tasdizen; "Principal Components for Non-Local Means Image Denoising", Image Processing 2008, 15th IEEE International Conference on 2008, pp. 1728-1731 (2008).

Buades et al.; "A Non-Local Algorithm for Image Denoising", Computer Vision and Pattern Recognition 2005 IEEE Computer Society Conference on 2005, vol. 2, pp. 60-65, (2005).

(Continued)

*Primary Examiner* — Anh Do
(74) *Attorney, Agent, or Firm* — Finnegan, Henderson, Farabow, Garrett & Dunner, L.L.P.

(57) ABSTRACT

According to one embodiment, an image processing apparatus includes first and second computation portions, a selection portion, a projection portion, and a weighted averaging portion. The first computation portion is configured to obtain magnitudes of correlations between a first vector and plural basis vectors. The selection portion is configured to select basis vectors from the plural basis vectors. The projection portion is configured to select a second region, obtain a first projection vector by projecting the first vector onto a subspace formed by the selected basis vectors and obtain a second projection vector for each second region by projecting a second vector onto the subspace. The second computation portion is configured to compute a distance between the first and second projection vectors. The weighted averaging portion is configured to weighted average a pixel value of the second pixel to obtain an output pixel value of a first pixel.

20 Claims, 7 Drawing Sheets

(56) References Cited

FOREIGN PATENT DOCUMENTS

| JP | 2002-157595 | 5/2002 |
|---|---|---|
| JP | 2002-318818 | 10/2002 |
| JP | 2006-269651 | 10/2006 |

OTHER PUBLICATIONS

International Search Report from the Japanese Patent Office for International Application No. PCT/JP2010/000126, mailing date Apr. 6, 2010.

\* cited by examiner

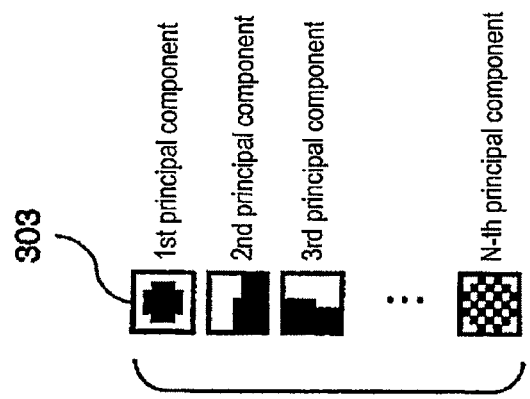
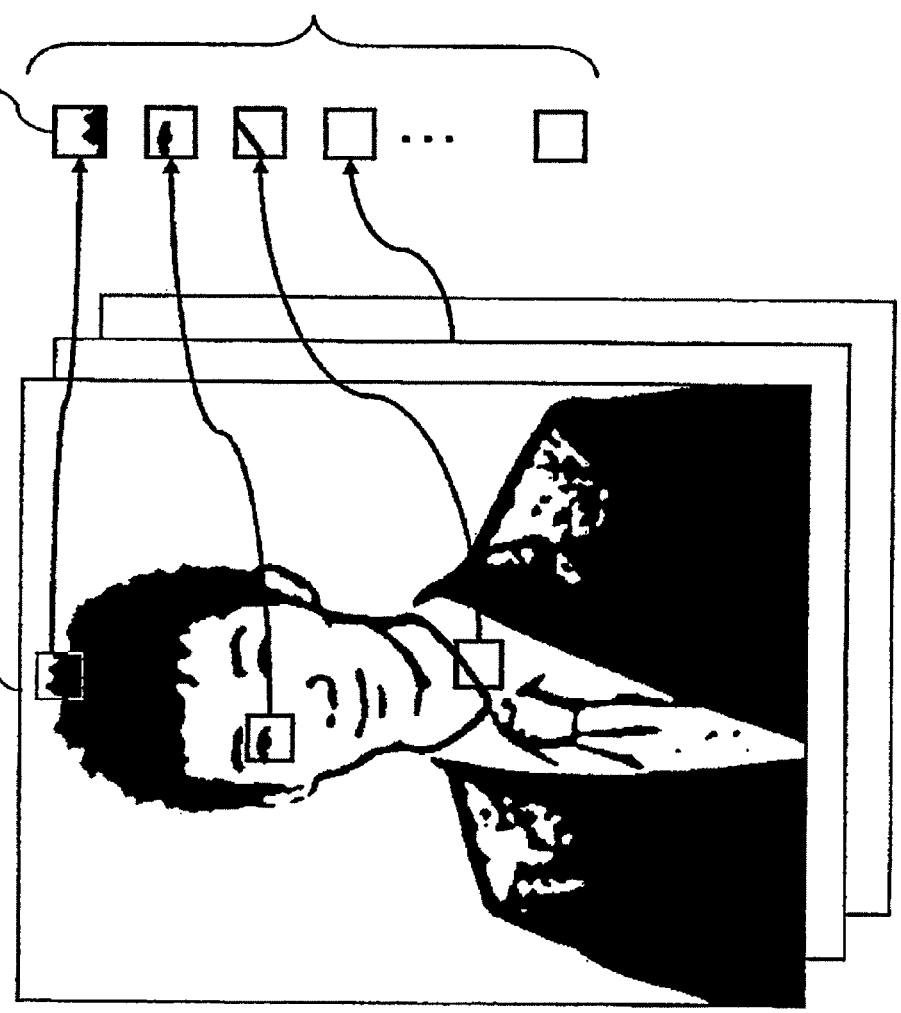

IMAGE PROCESSING APPARATUS AND METHOD

CROSS-REFERENCE TO RELATED APPLICATION(S)

This is a Continuation-In-Part application of PCT Application No. PCT/JP2010/000126, filed on Jan. 13, 2010, which was published under PCT Article 21(2) in Japanese, the entire contents of which are incorporated herein by reference.

BACKGROUND

Technical Field

Embodiments relate generally to an image processing apparatus and an image processing method for reducing noise in an image.

BRIEF DESCRIPTION OF THE DRAWINGS

FIGS. 2A to 2C are exemplary views showing an example of basis vectors;

DETAILED DESCRIPTION

Various embodiments will be described below in detail with reference to the accompanying drawings. Common reference signs are given to configurations and processes for performing the same operations, and duplicated description will be omitted.

According to one embodiment, an image processing apparatus includes a first computation portion, a selection portion, a projection portion, a second computation portion and a weighted averaging portion. The first computation portion is configured to obtain magnitudes of correlations between a first vector having, as elements, pixel values of pixels in a first region containing a first pixel in an image and a plurality of basis vectors. The selection portion is configured to select basis vectors from the plurality of basis vectors in accordance with the magnitudes of the correlations. The projection portion is configured to select second regions containing second pixels in the image, to obtain a first projection vector by projecting the first vector onto a subspace formed by the selected basis vectors and to obtain a second projection vector for each second region by projecting onto the subspace a second vector in which pixel values of pixels in each second region are arranged. The second computation portion is configured to compute, for each second region, a distance between the first projection vector and the second projection vector corresponding to each second region. The weighted averaging portion is configured to weighted average a pixel value of the second pixel with giving a larger weight to the second pixel as the distance corresponding to each second region is smaller so as to obtain an output pixel value of the first pixel.

First Embodiment

Figure 1:
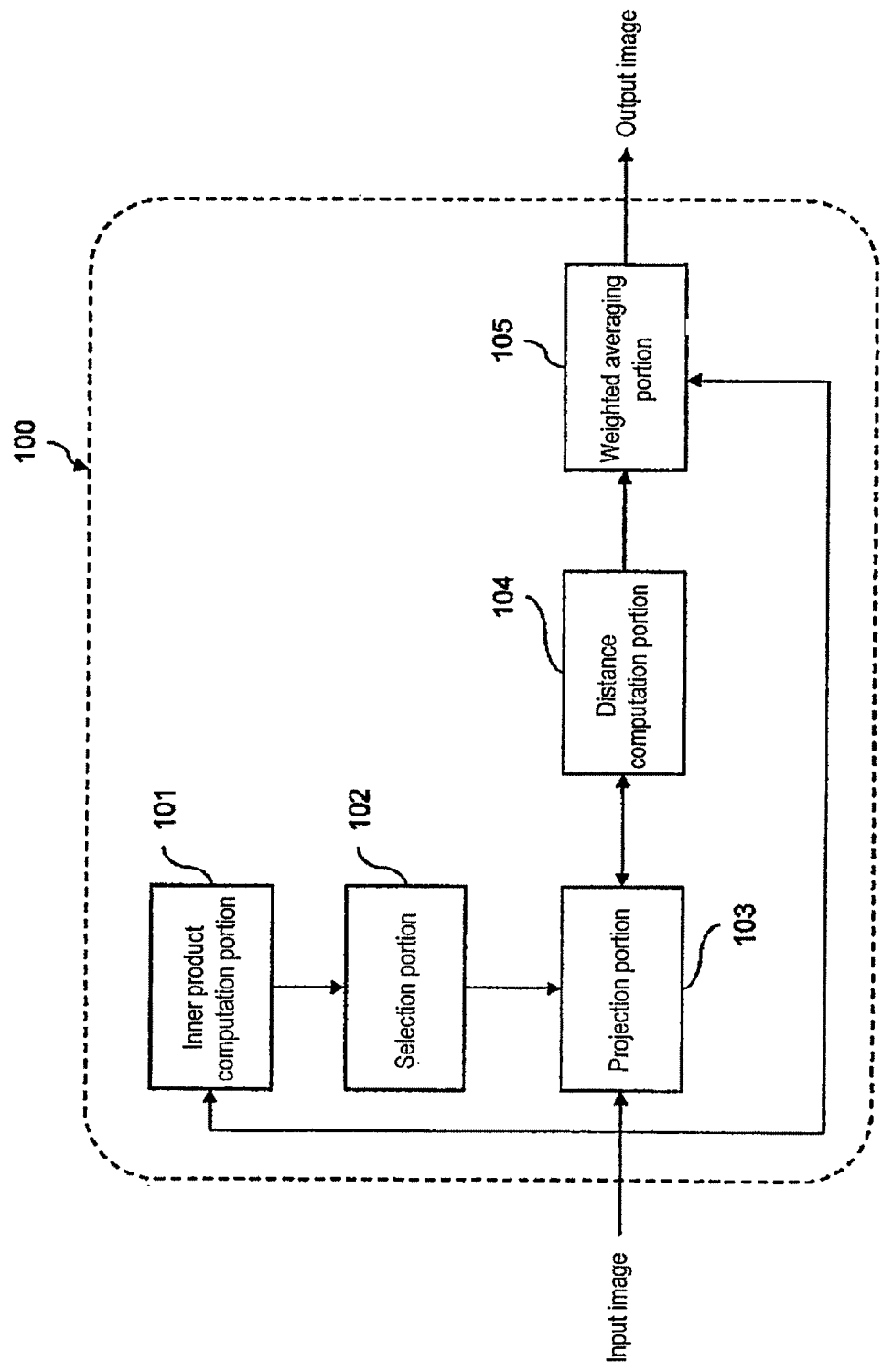
FIG. 1 is an exemplary diagram showing the configuration of an image processing apparatus according to a first embodiment.

FIG. 1 is an exemplary block diagram showing an image processing apparatus 100 according to a first embodiment.

The image processing apparatus 100 includes an inner product calculation portion 101, a selection portion 102, a projection portion 103, a distance calculation portion 104, and a weighted averaging portion 105.

The inner product calculation portion 101 calculates inner products of a first vector and a plurality of (e.g. M) basis vectors. The first vector has pixel values, which are arranged as its elements, of pixels in a first region containing a pixel to be processed (hereinafter referred to as first pixel) in an input image. The plurality of basis vectors are stored in the inner product calculation portion 101 in advance. A plurality of contribution degrees indicating magnitudes of correlations between the first vector and the basis vectors, respectively, are computed by squaring the computed inner products. Although this embodiment shows an example in which inner products are used to evaluate the magnitudes of correlations between the first vector and the basis vectors, the method is not limited to inner products. Any other method may be used so long as the method can evaluate the magnitudes of correlations between vectors. A larger value of a square of inner product indicates higher correlation between two vectors.

FIGS. 2A to 2C are exemplary views showing an example of computation of the basis vectors stored in advance. With regard to partial images 302 extracted from one or more images 301 in advance, a principal component analysis is performed on vectors in which pixel values of pixels contained in the respective partial images are arranged. Principal component vectors 303 thus obtained are used as a basis vector group. Each image 301 may be an input image or may be another image for learning. When the principal component analysis is used successively, the inner product computation portion 101 computes the basis vectors.

Other than the aforementioned method, (1) eigenvectors obtained by performing a canonical correlation analysis or an independent component analysis on images extracted from one or more images in advance, (2) bases of a two-dimensional discrete Fourier transform, (3) bases of a two-dimensional discrete wavelet transform, or the like, may be used as a basis vector group.

The selection portion 102 selects a plurality of (e.g. L, L≤M) basis vectors to be sent to the projection portion 103, from the plurality of basis vectors in accordance with the values of the inner products computed by the inner product computation portion 101. The selection method will be described later in detail.

The projection portion 103 computes a first projection vector by projecting the first vector onto a subspace formed by the basis vectors selected by the selection portion 102. The projection portion 103 further computes a second projection vector by projecting a second vector onto the subspace formed by the basis vectors selected by the selection portion 102. The second vector has pixel values, which are arranged as its elements, of pixels in a second region containing a second pixel (a pixel different from the first pixel) which is not a processing target and is in the input image. One or more second regions are selected successively in a search range.

The distance computation portion 104 computes an inter-vector distance between the first projection vector and the second projection vector, for each second region.

The weighted averaging portion 105 gives a large weight to a pixel value of each second pixel corresponding to the second projection vector having a relatively short inter-vector distance computed by the distance computation portion 104. Respective weights for the second pixels selected by the projection portion 103 are computed. A pixel value computed by weighted-averaging a sum of the second pixel values multiplied by the weights is set as an output pixel value of the first pixel. An output image in which the pixel value of the first pixel is replaced with the output pixel value computed by the weighted averaging portion 105 is output.

Next, an operation of the image processing apparatus 100 will be described below.

Figure 3:
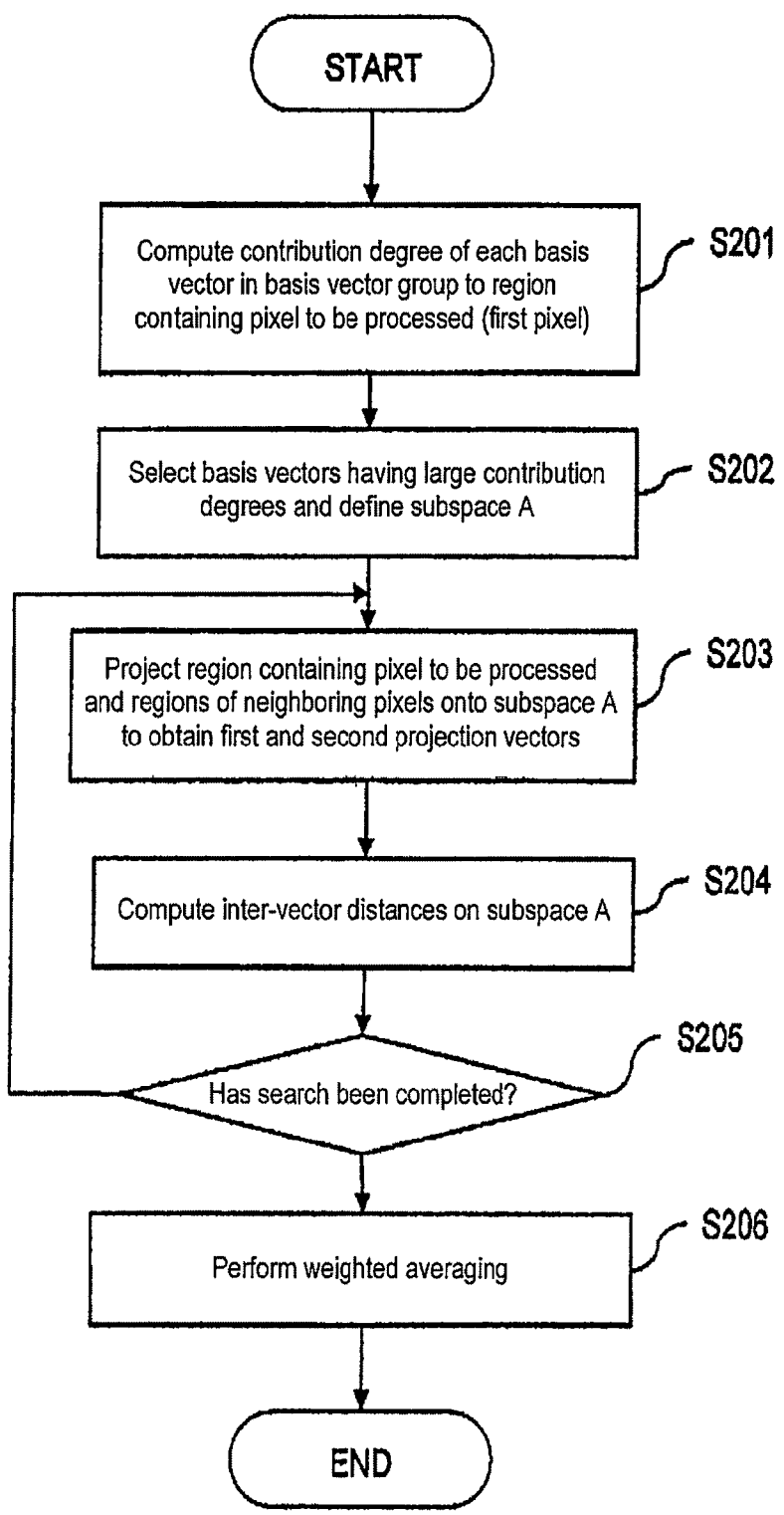
FIG. 3 is an exemplary flow chart showing an operation of the first embodiment.
Figures 4A, 4B, 4C:
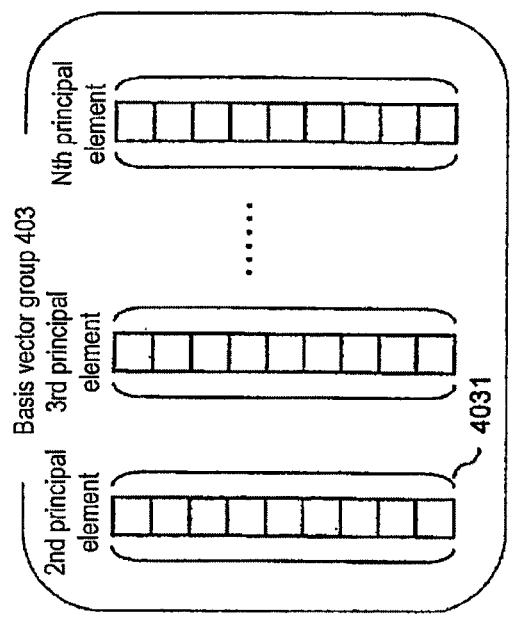
FIGS. 4A to 4E are exemplary views for explaining an operation of an inner product calculation portion.
Figure 4D:
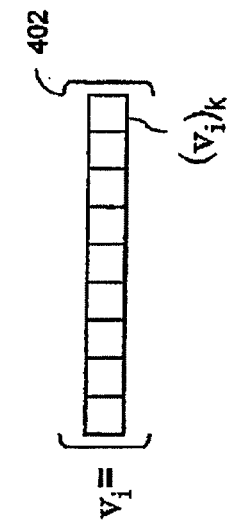
Figure 4E:
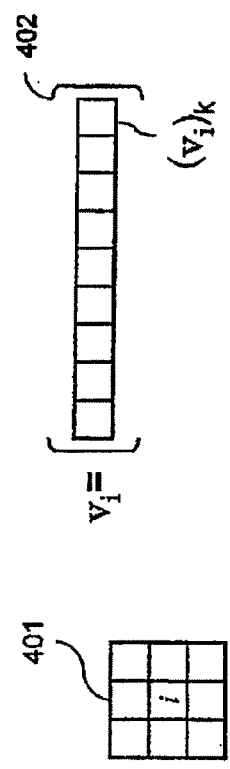

FIG. 3 is an exemplary flow chart showing the operation of the image processing apparatus 100. Description will be made with reference to FIGS. 4A to 4E which show an operation of the inner product computation portion 101. FIG. 4A is a view showing a region 401 containing a first pixel i. FIG. 4B is a view showing a first vector 402 corresponding to the region 401. FIG. 4C is a view showing a basis vector group 403 and respective basis vectors 4031 obtained by excluding a vector having the largest absolute value of a sum of elements (a first principal component vector in the example of FIG. 4C) from basis vectors obtained in advance. FIG. 4D is a view showing an example of contribution degrees 404 computed by the inner product calculation portion 101. FIG. 4E is a view showing an example of the contribution degrees 404 which are rearranged in descending order.

The inner product computation portion 101 computes squares of the inner products of the first vector 402 in which pixel values of pixels in the region 401 containing the first pixel i are arranged and the respective basis vectors 4031 of the basis vector group 403 (S201). The computed squares of the inner products indicate contribution degrees 404 of the respective basis vectors to the region 401 containing the first pixel i.

The first vector is expressed as $v_i$, and the k-th element of $v_i$ is expressed as $(v_i)_k$. Assuming that the vector having the largest absolute value of the sum of elements is the first principal component vector, then the contribution degree $p_n$ of the n-th basis vector in N−1 basis vectors $\{a_n | 2 \leq n \leq N\}$ obtained by excluding the first principal component vector from the prepared N basis vectors is computed by the expression 1.

$$p_n = \left[ \sum_k \{(v_i)_k (a_n)_k\} \right]^2 \quad \text{(Expression 1)}$$

An example of the computed contribution degrees 404 of the respective basis vectors is shown in FIG. 4E.

Then, the selection portion 102 rearranges the contribution degrees 404 computed by the inner product computation portion 101 in descending order and adds up the contribution degrees from the head until a sum of the contribution degrees 404 reaches a threshold value indicating a predetermined ratio. The selection portion 102 selects respective basis vectors corresponding to the contribution degrees which have been added so far when the sum of the contribution degrees 404 reaches the threshold value (S202). For example, in the case where the threshold is 0.7, the threshold $P_T$ is computed as follows.

$$P_T = 0.7 \sum_{n=2}^{N} p_n \quad \text{(Expression 2)}$$

$$P_T \geq \sum_{n=2}^{d} p_n \quad \text{(Expression 3)}$$

When the maximum d satisfying the expression 3 is obtained, the selection portion 102 selects d−1 basis vectors $\{a_n | 2 \leq n \leq d\}$.

It is considered that the inner product of the vector in which pixel values of pixels in a region in an image are arranged and each basis vector reflects a magnitude of a correlation to an image of the region. There is a high possibility that a basis vector having a small inner product is affected by noise. It is therefore considered that when a basis vector having a large inner product is selected for computation of an inter-vector distance in a subsequent stage, the inter-vector distance reflecting a characteristic of a signal in the region can be computed so that the influence of noise on the computation of the inter-vector distance can be reduced.

However, when the contribution degree is computed by use of all basis vectors (inclusive of the first principal component) in the basis vector group, that is, in accordance with the expression 4, an average pixel value in the region gives a large influence on selecting the basis vectors based on the contribution degree.

$$P_T = 0.7 \sum_{n=1}^{N} p_n \quad \text{(Expression 4)}$$

For example, since a contribution degree of a vector having a large absolute value of a sum of elements in a bright region is relatively high compared with that in a dark region, the vector having the large absolute value of the sum of elements is selected easily. An inner product of the vector having the large absolute value of the sum of elements has a high correlation to the average pixel value in the region. This means that a texture portion and a flat portion are not distinguished in a bright region if those portions are equal in average of brightness, which causes unevenness in a bright flat portion and blurring in a bright texture portion in the bright region. To deal with this matter, the configuration is made so that the contribution degree is computed by use of the basis vectors obtained excluding the vector having the largest absolute value of the sum of elements from the basis vector group. Thereby, in a bright region, a basis vector an absolute value of a sum of elements of which is small and which well represents a state of signal change is selected. Accordingly, even in the bright region, unevenness in the flat portion and blurring in the texture portion less occur.

Figure 5C:
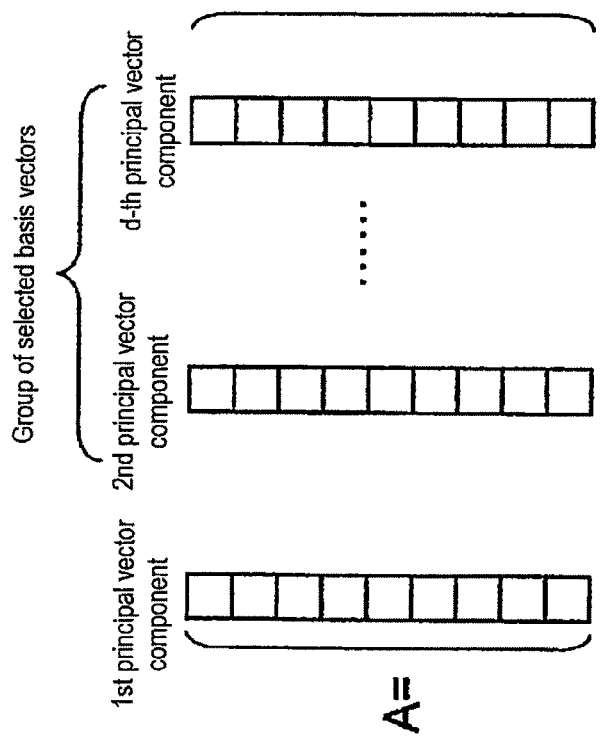
FIGS. 5A to 5C are exemplary views for explaining an operation of a projection portion.
Figure 5A:
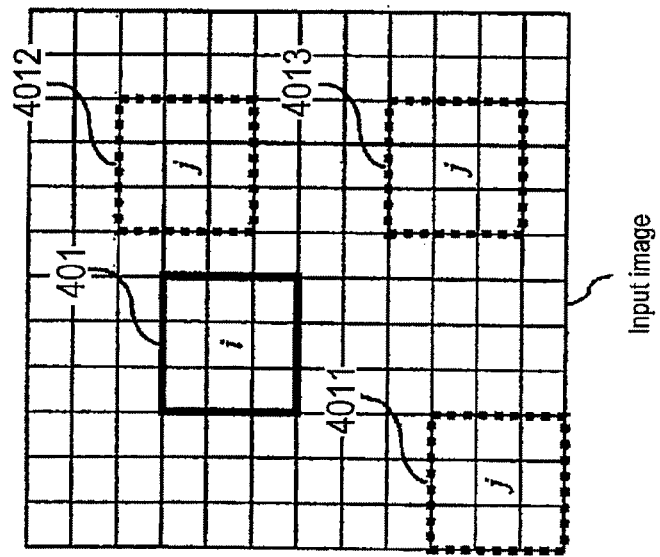
Figure 5B:
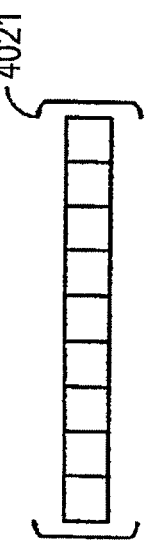

FIGS. 5A to 5C are exemplary views showing an operation of the projection portion 103. FIG. 5A is an exemplary view showing examples of a first pixel i, second pixels j, and second pixel-containing regions 4011 to 4013. FIG. 5B is an exemplary view showing a second vector 4021 corresponding to the region containing the second pixel. FIG. 5C is an exemplary view showing an example of a subspace A generated by the projection portion 103.

The projection portion 103 forms a subspace A by the d−1 basis vectors selected from the basis vector group at S202 and the basis vector having the largest absolute value of the sum of elements (the first principal component in the example of FIG. 5) and projects the first vector onto the subspace A to obtain a first projection vector. The projection portion 103 further projects a second vector 4021, in which pixel values of pixels in each of the second pixel-containing regions 4011 to 4013 in the input image are arranged, onto the subspace A to obtain a second projection vector (S203). When the d−1 basis vectors are selected at S202, the first projection vector $v'_i$ obtained by projecting the first vector $v_i$ onto the d-dimensional subspace A is expressed as follows.

$$v'_i = \sum_{n=1}^{d} f_{i,n} a_n \quad \text{(Expression 5)}$$

where $f_{i,n}$ denotes the inner product of the first vector $v_i$ and the n-th basis vector $a_n$. Similarly, the second projection vector $v'_j$ obtained by projecting the second vector $v_j$ onto the subspace A is expressed as follows.

$$v'_j = \sum_{n=1}^{d} f_{j,n} a_n \quad \text{(Expression 6)}$$

The distance computation portion 104 computes an inter-vector distance on the subspace A between the first projection vector and the second projection vector (S204). Assuming that the first and second projection vectors obtained at S203 are $v'_i$ and $v'_j$ respectively, then the inter-vector distance D(i,j) between $v'_i$ and $v'_j$ is calculated as follows.

$$D(i, j) = \sum_{n=1}^{d} \{(v'_i)_n - (v'_j)_n\}^2 \quad \text{(Expression 7)}$$

The distance computation portion 104 determines as to whether or not all second projection vectors for the second pixels in a predetermined search range have been already computed (S205). The search range for the second pixels may be any of various ranges, such as all pixels in an image containing the first pixel, pixels in a range near a second pixel, pixels in an image containing no first pixel, etc. For example, in the case of an input image acquired by a sensor, it is effective that pixels on the same line are selected as second pixels. If the second projection vectors for all the second pixels in the search range have been computed (Yes at S205), the weighted averaging portion 105 performs such a weighted averaging process that a larger weight is given to a pixel value of each second pixel as the computed inter-vector distance is shorter, and replaces the pixel value of the first pixel with the weighted average of the pixel values of the second pixels (S206). An output pixel value $\hat{x}_i$ of the first pixel ("a character P superscribed with a hat sign ^" in expressions will be noted as "P^" in this description) is, for example, computed as follows with use of the pixel value $x_j$ of the second pixel.

$$\hat{x}_i = \frac{1}{Z(i)} \sum_{j \in \Omega(i)} \exp\left(-\frac{D(i,j)}{h}\right) x_j \quad \text{(Expression 8)}$$

$$Z(i) = \sum_{j \in \Omega(i)} \exp\left(-\frac{D(i,j)}{h}\right)$$

where $\Omega(i)$ denotes a range for searching for the second pixels, and h denotes a parameter larger than 0.

As described above, according to the image processing apparatus of this embodiment, the distance in the space reflecting the characteristic of the peripheral region of the pixel to be processed is computed so that the inter-vector distance between two regions different in characteristic can be prevented from being shortened. Therefore, the weights of pixels in regions different in characteristic can be prevented from becoming large at weighted averaging. Accordingly, noise can be reduced while sharpness can be kept in the texture portion whereas noise can be reduced without occurrence of unevenness in the flat portion.

Second Embodiment

An image processing apparatus 600 according to a second embodiment is different from the image processing apparatus 100 according to the first embodiment in that the image processing apparatus 600 is provided with a noise computation portion 601 which computes an amount of noise. An operation of a selection portion 602 varies according to the amount of noise computed by the noise computation portion 601.

Figure 6:
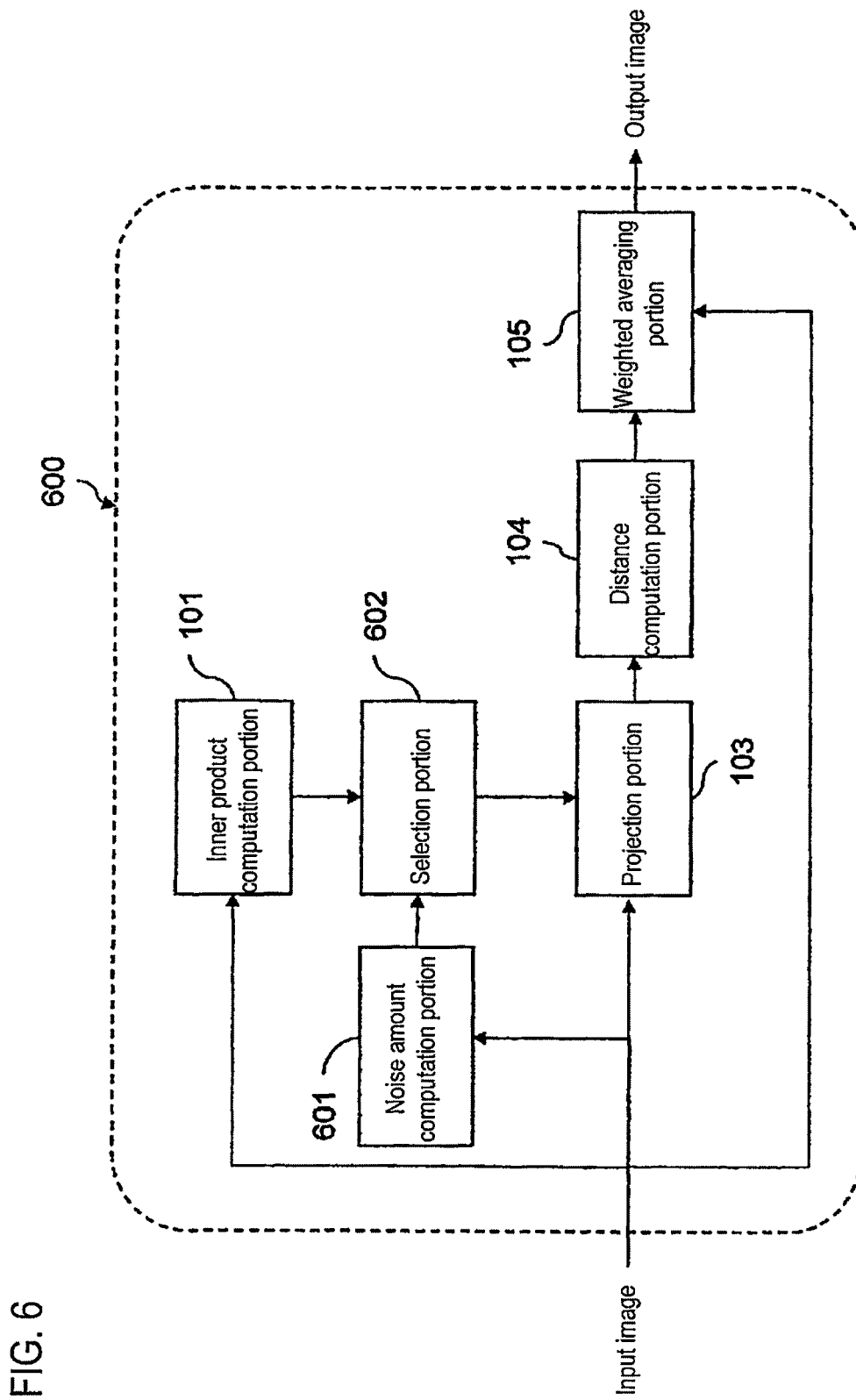
FIG. 6 is an exemplary diagram showing the configuration of an image processing apparatus according to a second embodiment.

FIG. 6 is an exemplary diagram showing the image processing apparatus 600.

The noise amount computation portion 601 computes an amount of noise superposed on a first pixel in an input image.

The selection portion 602 computes inner products of a first vector in which pixel values of pixels in a first region containing the first pixel are arranged and a plurality of basis vectors, and selects basis vectors having large inner products so that the number of selected basis vectors decreases as the computed amount of noise increases.

Figure 7:
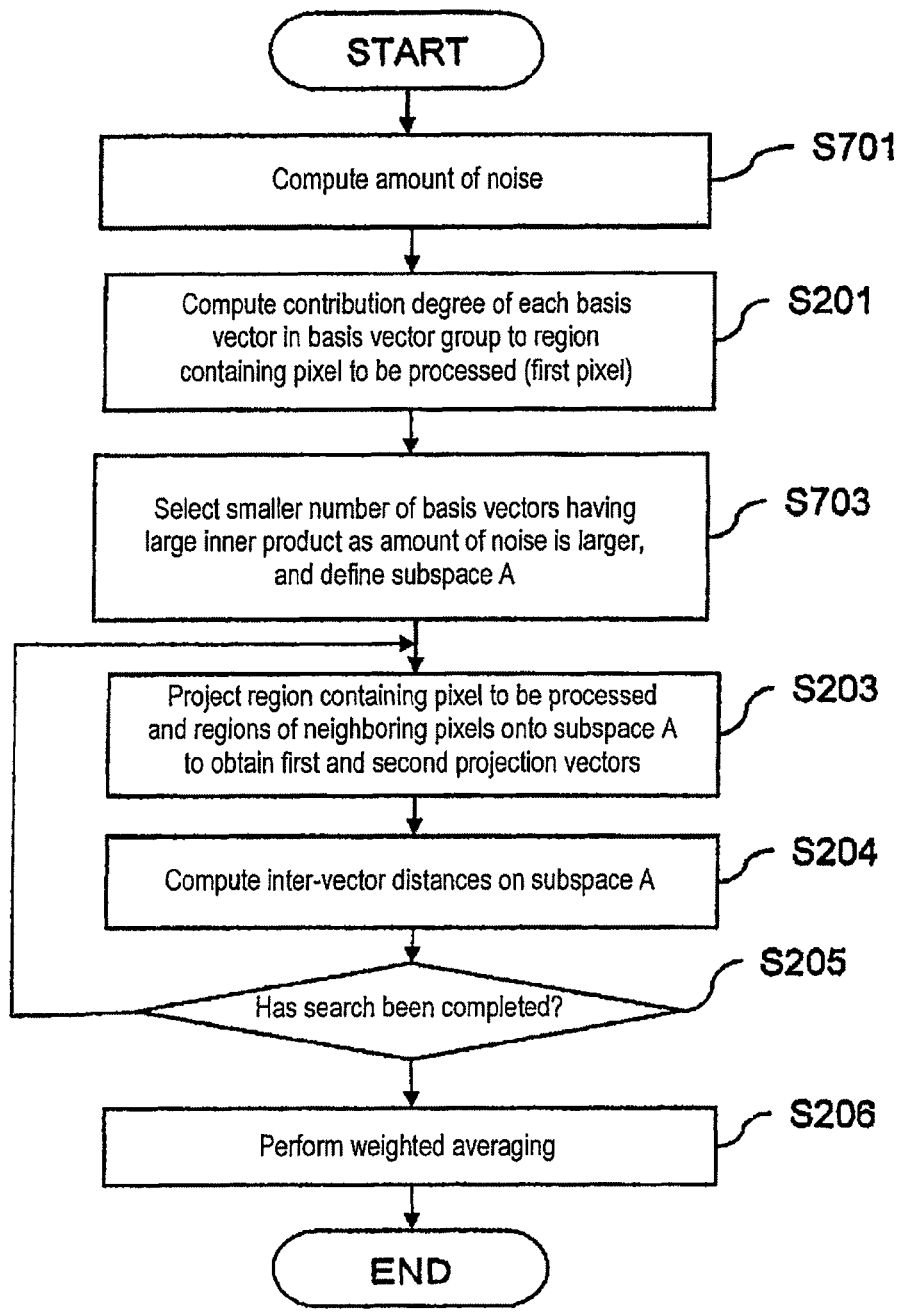
FIG. 7 is an exemplary flow chart showing an operation of the second embodiment.

FIG. 7 is an exemplary flow chart showing an operation of the image processing apparatus 600. This embodiment will be described about an example in which the principal component analysis is performed on partial images extracted from one or more images in advance so that principal component vectors thus obtained are used as a basis vector group.

The noise amount computation portion 601 estimates an amount of noise superposed on a first region containing a first pixel which is a processing target in an input image (S701). For example, the amount of noise can be computed as a value obtained by multiplying the square root of the average of pixel values in the first region by a parameter not smaller than 0. Alternatively, the standard deviation of the pixel values in the first region may be used as the amount of noise. Incidentally, besides the amount of noise computed by the estimation from the input image, for example, ISO sensitivity may be used as the amount of noise when the image processing apparatus is incorporated into a digital camera or the like. For example, a value having a negative correlation to an irradiated X-ray dose may be used as the amount of noise when the image processing apparatus is incorporated into an X-ray transmission apparatus or the like. In addition, when the amount of noise generated in each of these image capturing apparatuses is known, that value can be used.

The selection portion 602 rearranges the contribution degrees computed at S201 in descending order, sets a value of a predetermined percentage of a sum of the contribution degrees as a threshold value, and adds the contribution degrees from the head until the sum of the added contribution degrees reaches the threshold value. Computation is performed except the vector having the largest absolute value of the sum of elements in the same manner as in S202. On this occasion, the threshold value is determined so that the threshold value decreases as the amount of noise calculated in S701 increases. When the sum of the added contribution degrees reaches the threshold value, the selection portion 602 selects respective basis vectors corresponding to the contribution degrees which have been added so far (S703).

According to the image processing apparatus in the second embodiment, when the amount of noise superposed on the image is small, the number of basis vectors to be selected is increased automatically so that signal change in the input image remains faithfully. Thus, signals in the texture portion can be prevented from being added to the flat portion. Therefore, unevenness in the flat portion can be reduced further more than that in the first embodiment. When the amount of noise is large, the number of basis vectors to be selected is reduced automatically so that a subspace can be formed by only basis vectors particularly reflecting the state of signal change. Therefore, the influence of noise on computation of the inter-vector distances is reduced effectively so that noise can be removed while sharpness of the texture can be kept as compared with the case where the number of basis vectors is large.

Modification 1

In the first and second embodiments, the basis vector group may be formed of principal component vectors except vectors having eigenvalues smaller than a predetermined threshold value, the eigenvalues being obtained by the principal component analysis and corresponding to the principal component vectors.

Modification 2

In the first and second embodiments, the contribution degrees of basis vectors in a basis vector group except a vector having the largest absolute value of the sum of elements may be added in order of eigenvalue obtained by the principal component analysis without rearrangement of the contribution degrees in the inner product computation portion, and when the sum of the added contribution degrees reaches the threshold value, respective basis vectors corresponding to the contribution degrees which have been added so far may be selected.

Modification 3

In the first and second embodiments, the inner product computation portion may be designed so as to compute the contribution degrees of basis vectors each having a smaller absolute value of the sum of elements than a predetermined threshold value in a basis vector group. In addition, the contribution degree of each basis vector may be computed after the average pixel value in the first region is subtracted.

Modification 4

In the first and second embodiments, the absolute values of the inner products of a first vector in which pixel values of pixels located in a peripheral region containing a first pixel are arranged and basis vectors may be used as contribution degrees of the basis vectors. In this case, the expression 9 is used as a contribution degree in place of the expression 1.

$$p'_n = \sum_k |(v_i)_k (a_n)_k| \quad \text{(Expression 9)}$$

where |•| is a sign indicating an absolute value.

Modification 5

In the first and second embodiments, the expression. 10 may be used as the inter-vector distance between the first projection vector and the second projection vector in place of the expression 4.

$$D(i, j) = \sum_{n=1}^{d} |(v'_i)_n - (v'_j)_n| \quad \text{(Expression 10)}$$

Incidentally, the invention is not limited to the aforementioned embodiments per se but constituent members can be modified to embody the invention without departing from the gist of the invention in a practical stage. A plurality of constituent members disclosed in the aforementioned embodiments may be combined suitably to form various inventions. For example, some constituent members may be removed from all constituent members shown in one of the embodiments. In addition, constituent members disclosed in different embodiments may be combined suitably.

Incidentally, this image processing apparatus can be implemented, for example, by a general-purpose computer apparatus used as basic hardware. That is, the inner product calculation portion, the projection portion, the distance calculation portion and the weighted averaging portion can be implemented by a program executed in a processor mounted in the aforementioned computer apparatus. On this occasion, the image processing apparatus may be implemented by the aforementioned program which is installed in the computer apparatus in advance or may be implemented by the aforementioned program which is stored in a storage medium such as a CD-ROM or distributed through a network so as to be installed in the computer apparatus appropriately.

What is claimed is:

1. An image processing apparatus comprising:
   a first computation portion configured to obtain magnitudes of correlations between a first vector having, as elements, pixel values of pixels in a first region containing a first pixel in an image and a plurality of basis vectors;
   a selection portion configured to select basis vectors from the plurality of basis vectors in accordance with the magnitudes of the correlations;
   a projection portion configured to select second regions containing second pixels in the image, to obtain a first projection vector by projecting the first vector onto a subspace formed by the selected basis vectors and to obtain a second projection vector for each second region by projecting onto the subspace a second vector in which pixel values of pixels in each second region are arranged;
   a second computation portion configured to compute, for each second region, a distance between the first projection vector and the second projection vector corresponding to each second region; and
   a weighted averaging portion configured to weighted average a pixel value of the second pixel with giving larger weights to the second pixel as the distance corresponding to each second region is smaller so as to obtain an output pixel value of the first pixel.

2. The image processing apparatus according to claim 1, wherein the projection portion selects a plurality of second regions each containing the second pixel.

3. The image processing apparatus according to claim 1, wherein the first computation portion computes the magnitudes of the correlations based on inner products of the first vector and the plurality of basis vectors.

4. The image processing apparatus according to claim 2, wherein
the first computation portion computes the magnitudes of the correlations based on squared inner products of the first vector and the plurality of basis vectors, and
the selection portion adds the magnitudes of the correlations from the basis vector having the largest magnitude of the correlation until a sum of the added magnitudes of the correlations reaches a predetermined threshold value and selects the basis vectors having the magnitudes of the correlations which have been added until the sum of the added magnitudes of the correlations reaches the threshold value.

5. The image processing apparatus according to claim 2, wherein
the first computation portion computes the magnitudes of the correlations based on absolute values of inner products of the first vector and the plurality of basis vectors, and
the selection portion adds the magnitudes of the correlations from the basis vector having the largest magnitude of the correlation until a sum of the added magnitudes of the correlations reaches a predetermined threshold value and selects the basis vectors having the magnitudes of the correlations which have been added until the sum of the added magnitudes of the correlations reaches the threshold value.

6. The image processing apparatus according to claim 2, wherein
the selection portion selects the basis vectors in accordance with the magnitudes of the correlations from the plurality of basis vectors except basis vectors in each of which an absolute value of a sum of elements is larger than a predetermined criterion, and
the projection portion forms the subspace by the basis vectors in each of which the absolute value of the sum of the elements is larger than the predetermined criterion, and the selected basis vectors.

7. The image processing apparatus according to claim 1, further comprising:
a noise amount computation portion that computes an amount of noise in the first region containing the first pixel, wherein
the selection portion selects the basis vectors so that a number of the selected basis vectors is smaller as the amount of noise is larger.

8. The image processing apparatus according to claim 2, wherein the first computation portion computes the basis vectors by performing a principal component analysis on a plurality of blocks which are extracted from at least one image in advance.

9. The image processing apparatus according to claim 2, wherein the first computation portion uses base of a two-dimensional discrete wavelet transform as the basis vectors.

10. The image processing apparatus according to claim 2, wherein the first computation portion computes the basis vectors by performing an independent component analysis on a plurality of blocks which are extracted from at least one image in advance.

11. An image processing method comprising:
obtaining, by a processor, magnitudes of correlations between a first vector having, as elements, pixel values of pixels in a first region containing a first pixel in an image and a plurality of basis vectors;
selecting basis vectors from the plurality of basis vectors in accordance with the magnitudes of the correlations;
selecting second regions containing second pixels in the image;
obtaining a first projection vector by projecting the first vector onto a subspace formed by the selected basis vectors;
obtaining a second projection vector for each second region by projecting onto the subspace a second vector in which pixel values of pixels in each second region are arranged;
computing, for each second region, a distance between the first projection vector and the second projection vector corresponding to each second region; and
weighted averaging a pixel value of the second pixel with giving a larger weight to the second pixel as the distance corresponding to each second region is smaller so as to obtain an output pixel value of the first pixel.

12. The image processing method according to claim 11, wherein the selecting of the second regions selects a plurality of second regions each containing the second pixel.

13. The image processing method according to claim 11, wherein the obtaining of the magnitudes of the correlations includes computing the magnitudes of the correlations based on inner products of the first vector and the plurality of basis vectors.

14. The image processing method according to claim 12, wherein
the obtaining of the magnitudes of the correlations includes the magnitudes of the correlations based on squared inner products of the first vector and the plurality of basis vectors, and
the selecting of the basis vectors includes
adding the magnitudes of the correlations from the basis vector having the largest magnitude of the correlation until a sum of the added magnitudes of the correlations reaches a predetermined threshold value, and
selecting the basis vectors having the magnitudes of the correlations which have been added until the sum of the added magnitudes of the correlations reaches the threshold value.

15. The image processing method according to claim 12, wherein
the obtaining of the magnitudes of correlations includes computing the magnitudes of the correlations based on absolute values of inner products of the first vector and the plurality of basis vectors, and
the selecting of the basis vectors includes
adding the magnitudes of the correlations from the basis vector having the largest magnitude of the correlation until a sum of the added magnitudes of the correlations reaches a predetermined threshold value, and
selecting the basis vectors having the magnitudes of the correlations which have been added until the sum of the added magnitudes of the correlations reaches the threshold value.

16. The image processing method according to claim 12, wherein
the selecting of the basis vector includes selecting the basis vectors in accordance with the magnitudes of the correlations from the plurality of basis vectors except basis vectors in each of which an absolute value of a sum of elements is larger than a predetermined criterion, and
the obtaining of the first projection vector includes forming the subspace by the basis vectors in each of which the absolute value of the sum of the elements is larger than the predetermined criterion, and the selected basis vectors.

17. The image processing method according to claim 11, further comprising:
   computing an amount of noise in the first region containing the first pixel, wherein
   the selecting of the basis vector includes selecting the basis vectors so that a number of the selected basis vectors is smaller as the amount of noise is larger.

18. The image processing method according to claim 12, wherein the obtaining of the magnitudes of the correlations includes computing the basis vectors by performing a principal component analysis on a plurality of blocks which are extracted from at least one image in advance.

19. The image processing method according to claim 12, wherein the obtaining of the magnitudes of the correlations includes using base of a two-dimensional discrete wavelet transform as the basis vectors.

20. The image processing method according to claim 12, wherein the obtaining of the magnitudes of the correlations includes computing the basis vectors by performing an independent component analysis on a plurality of blocks which are extracted from at least one image in advance.

* * * * *